United States Patent
Henry et al.

(10) Patent No.: US 8,402,279 B2
(45) Date of Patent: Mar. 19, 2013

(54) APPARATUS AND METHOD FOR UPDATING SET OF LIMITED ACCESS MODEL SPECIFIC REGISTERS IN A MICROPROCESSOR

(75) Inventors: G. Glenn Henry, Austin, TX (US); Terry Parks, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 985 days.

(21) Appl. No.: 12/391,781

(22) Filed: Feb. 24, 2009

(65) Prior Publication Data

US 2010/0064117 A1    Mar. 11, 2010

Related U.S. Application Data

(60) Provisional application No. 61/095,350, filed on Sep. 9, 2008.

(51) Int. Cl.
*G06F 12/14*    (2006.01)
(52) U.S. Cl. .................................. 713/189
(58) Field of Classification Search ............ 713/189
See application file for complete search history.

(56) References Cited

U.S. PATENT DOCUMENTS

| | | | |
|---|---|---|---|
| 5,774,544 A | 6/1998 | Lee et al. | |
| 5,790,663 A | 8/1998 | Lee et al. | |
| 5,790,783 A | 8/1998 | Lee et al. | |
| 6,154,818 A | 11/2000 | Christie | |
| 6,704,872 B1 | 3/2004 | Okada | |
| 7,043,616 B1* | 5/2006 | McGrath | 711/163 |
| 7,366,849 B2* | 4/2008 | Poisner | 711/152 |
| 7,366,911 B2* | 4/2008 | Garay et al. | 713/180 |
| 8,130,959 B2 | 3/2012 | Goodman et al. | |
| 2003/0101322 A1* | 5/2003 | Gardner | 711/163 |
| 2003/0196096 A1 | 10/2003 | Sutton | |
| 2004/0139346 A1* | 7/2004 | Watt et al. | 713/200 |
| 2004/0190558 A1 | 9/2004 | Oliver | |
| 2007/0006213 A1 | 1/2007 | Shahidzadeh et al. | |
| 2007/0098152 A1 | 5/2007 | Detrick et al. | |
| 2008/0163383 A1 | 7/2008 | Kumar et al. | |
| 2009/0096481 A1 | 4/2009 | Butter | |
| 2010/0235645 A1 | 9/2010 | Henry et al. | |
| 2011/0035599 A1 | 2/2011 | Henry et al. | |

OTHER PUBLICATIONS

"Live Migration with AMD-V™ Extended Migration Technology." pp. 1-8. AMD White Paper. AMD Smarter Choice. Downloaded on Sep. 5, 2008 from http://developer.amd.com/assets/Live%20Virtual%20Machine%20Migration%20on%20AMD%20processors.pdf.
"Live Migration with AMD-V™ Extended Migration Technolog y." AMD White Paper. pp. 1-8. 2007. "Live Migration with AMD-V™ Extended Migration Technology." AMD White Paper. Pages 1-8. Downloaded from http://developer.amd.com/assets/Live%20Virtual%20Machine%20Migration%20on%20AMD%20processors.pdf. Downloaded on Sep. 5, 2008.

* cited by examiner

*Primary Examiner* — Kambiz Zand
*Assistant Examiner* — Abiy Getachew
(74) *Attorney, Agent, or Firm* — E. Alan Davis; James W. Huffman

(57) ABSTRACT

A microprocessor having model specific registers (MSRs) includes, for each of the MSRs, an associated default value that indicates whether the MSR is protected or non-protected and an associated fuse that, if blown, toggles the associated default value from protected to non-protected or non-protected to protected. In one embodiment, microcode that does the following in response to the microprocessor encountering an instruction that accesses a specified MSR: determines whether the fuse associated with the specified MSR is blown or unblown, uses the default value associated with the MSR as an indicator of whether the MSR is protected if the associated fuse is unblown; toggles the associated default value to generate the indicator if the associated fuse is blown; protects access to the MSR if the indicator indicates the MSR is protected; and refrains from protecting access to the MSR if the indicator indicates the MSR is non-protected.

29 Claims, 2 Drawing Sheets

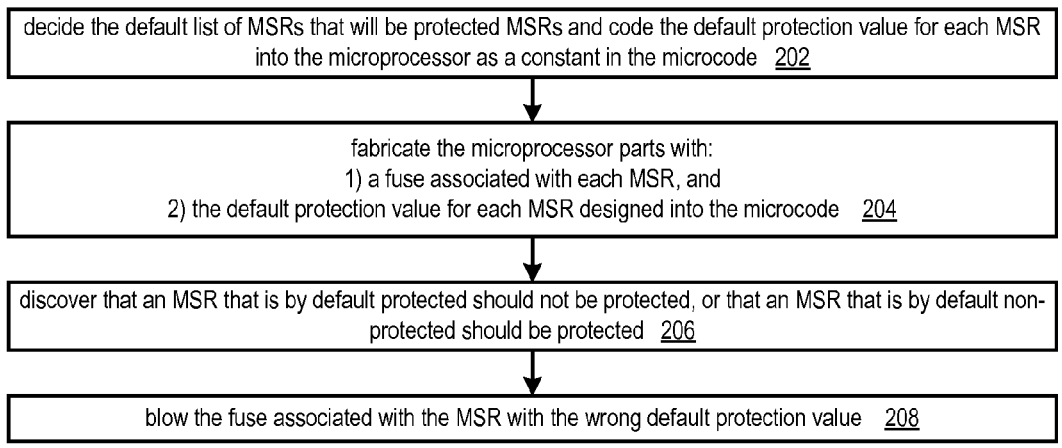
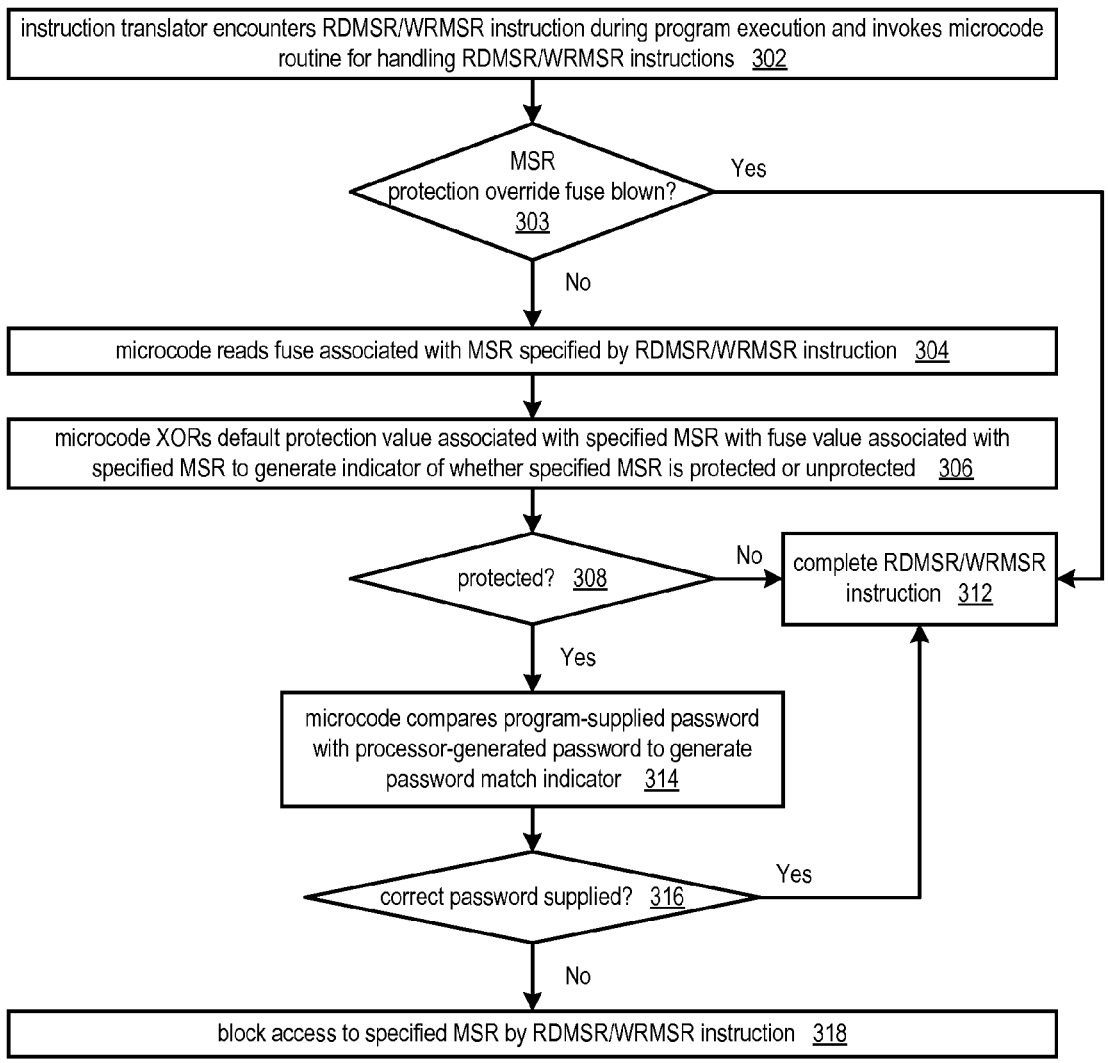

APPARATUS AND METHOD FOR UPDATING SET OF LIMITED ACCESS MODEL SPECIFIC REGISTERS IN A MICROPROCESSOR

CROSS REFERENCE TO RELATED APPLICATIONS

This application claims priority to Provisional Application No. 61/095,350, filed 09/09/2008, which is incorporated by reference herein in its entirety for all purposes.

FIELD OF THE INVENTION

The present invention relates in general to the field of microprocessors, and particularly to limiting access to model specific registers of microprocessors.

BACKGROUND OF THE INVENTION

Modern microprocessors include general purpose registers that are architecturally visible to programs. The programs use the general purpose registers to perform their necessary functions, such as arithmetical and logical calculations or movement of data between the microprocessor and memory or I/O devices. For example, within microprocessors that conform to the IA-32 Intel Architecture (also commonly known as the x86 architecture), general purpose registers include the EAX, EBX, ECX, EDX, ESI, EDI, ESP, and EBP registers, as well as the x86 floating-point register set and the multimedia-related MMX and XMM register sets.

In addition, it has become increasingly more common for microprocessors to also include registers that are accessible by programs, but that are not general purpose registers in the sense that the microprocessor restricts access to these non-general purpose registers unless the program attempting to access them has the requisite authority, or privilege, to do so. For example, within x86-compatible microprocessors exist model-specific registers (MSRs) that are control registers that may only be accessed by programs executing at the highest privilege level. The MSRs typically allow system software (i.e., privileged software) to enable, disable or configure various features of the microprocessor. In particular, the features may be specific to the microprocessor model. Examples of the features include performance, debugging, testing, monitoring, or power conservation features, among others. As an example, see Appendix B, *Model-Specific Registers (MSRs)*, in the *IA-32 Intel Architecture Software Developer's Manual, Volume 3B: System Programming Guide, Part 2*, June 2006 for a list of MSRs included on various Intel microprocessor models.

Many of the features that may be controlled by MSRs are relatively benign. However, some of the features that may be controlled by MSRs can drastically affect operation of the microprocessor. Because of the potentially drastic effects, some microprocessor manufacturers have gone even one step farther than requiring a high privilege level in restricting access to particularly "dangerous" MSRs. For example, certain models of microprocessors manufactured by Advanced Micro Devices, Inc. (AMD®) require the system software to provide a password in a general purpose register in order to access a subset of the MSRs of the processor, namely those MSRs that control certain features of the microprocessor's operation that the manufacturer considers dangerous.

Password-protecting access to MSRs has benefits; however, it also adds a burden to system software that needs to access the MSRs. In particular, password-protecting access to a subset of the MSRs of a processor raises the issue of whether the manufacturer has correctly identified the correct subset of MSRs to password protect. Conventionally, the subset of password-protected MSRs is hardcoded, that is, the subset is fixed at the time the manufacturer fabricates the microprocessor. This may be problematic if the manufacturer later discovers that it has password-protected an MSR that it now wishes it had not password-protected, or has not password-protected an MSR that it now wishes it had password-protected. At this point, the manufacturer will likely have to discard the parts that have already been fabricated with the undesirable subset of password-protected MSRs, which may potentially cause the manufacturer to lose a large amount of revenue. The probability of selecting the wrong subset of MSRs to password-protect increases as the number of MSRs per model increases, and in recent times the number of MSRs has proliferated. Therefore, what is needed is a way to alter the subset of password-protected MSRs in a microprocessor after the microprocessor has been fabricated.

BRIEF SUMMARY OF INVENTION

The present invention provides a way to alter the subset of password-protected MSRs in a microprocessor after the microprocessor has been fabricated by fabricating into the microprocessor a fuse associated with each MSR that may be blown during subsequent manufacturing of the microprocessor. When the fuse associated with an MSR is blown, it causes the default password-protected/non-password-protected state of the MSR to be toggled, thus allowing the subset of password-protected MSRs in the microprocessor to be changed.

In one aspect the present invention provides a microprocessor having model specific registers (MSRs). The microprocessor includes for each of the MSRs an associated default value that indicates whether the MSR is protected or non-protected. The microprocessor also includes for each of the MSRs an associated fuse that, if blown, toggles the associated default value from protected to non-protected or non-protected to protected. In one embodiment, the microprocessor also includes microcode that does the following in response to the microprocessor encountering an instruction that accesses a specified MSR of the MSRs: determines whether the fuse associated with the specified MSR is blown or unblown; uses the default value associated with the specified MSR as an indicator of whether the specified MSR is protected if the fuse associated with the specified MSR is unblown; toggles the default value associated with the MSR to generate the indicator if the fuse associated with the specified MSR is blown; protects access to the specified MSR if the indicator indicates the specified MSR is protected; and refrains from protecting access to the specified MSR if the indicator indicates the specified MSR is non-protected.

In another aspect, the present invention provides a method for protecting access to model specific registers (MSRs) within a microprocessor. The method includes fabricating the microprocessor to include, for each of the MSRs, an associated default value that indicates whether the MSR is protected or non-protected. The method also includes fabricating the microprocessor to include, for each of the MSRs, an associated fuse that, if blown, toggles the associated default value from protected to non-protected or non-protected to protected. In one embodiment, the method also includes blowing one or more of the fuses subsequent to the fabricating the microprocessor to include, for each of the MSRs, the associated default value and the associated fuse.

In yet another aspect, the present invention provides a method for protecting access to model specific registers (MSRs) within a microprocessor. The method includes encountering an instruction that accesses a specified MSR of the MSRs. The method also includes determining whether a fuse associated with the specified MSR is blown or unblown. The method also includes using a default value associated with the specified MSR as an indicator of whether the specified MSR is protected when the fuse associated with the specified MSR is unblown. The method also includes toggling the default value associated with the MSR to generate the indicator if the fuse associated with the specified MSR is blown. The method also includes refraining from toggling the default value associated with the MSR to generate the indicator if the fuse associated with the specified MSR is unblown. The method also includes protecting access to the specified MSR if the indicator indicates the specified MSR is protected. The method also includes refraining from protecting access to the specified MSR if the indicator indicates the specified MSR is non-protected.

In yet another aspect, the present invention provides a computer program product for use with a computing device, the computer program product including a computer usable storage medium, having computer readable program code embodied in the medium, for specifying a microprocessor having model specific registers (MSRs). The computer readable program code includes first program code for specifying for each of the MSRs an associated default value that indicates whether the MSR is protected or non-protected. The computer readable program code also includes second program code for specifying for each of the MSRs an associated fuse that, if blown, toggles the associated default value from protected to non-protected or non-protected to protected.

An advantage of the present invention is that it may save the microprocessor manufacturer a potentially large amount of revenue by avoiding having to discard already-fabricated parts whose subset of password-protected MSRs is undesirable. Furthermore, it may greatly reduce the amount of time the manufacturer has to stop shipment of its particular model of microprocessor in the event that it discovers that it has password-protected an MSR that it now wishes it had not password-protected, or vice versa, since the present invention enables the manufacturer to quickly remedy the problem by simply blowing fuses in the manufacturing process rather than having to re-design semiconductor and/or metal mask layers of the microprocessor and fabricate new parts.

BRIEF DESCRIPTION OF THE DRAWINGS

FIG. 2 is a flowchart illustrating aspects of the design and manufacturing process of the microprocessor of FIG. 1 according to the present invention.

FIG. 3 is a flowchart illustrating operation of the microprocessor of FIG. 1 to process a RDMSR/WRMSR instruction according to the present invention.

DETAILED DESCRIPTION OF THE INVENTION

Figure 1:
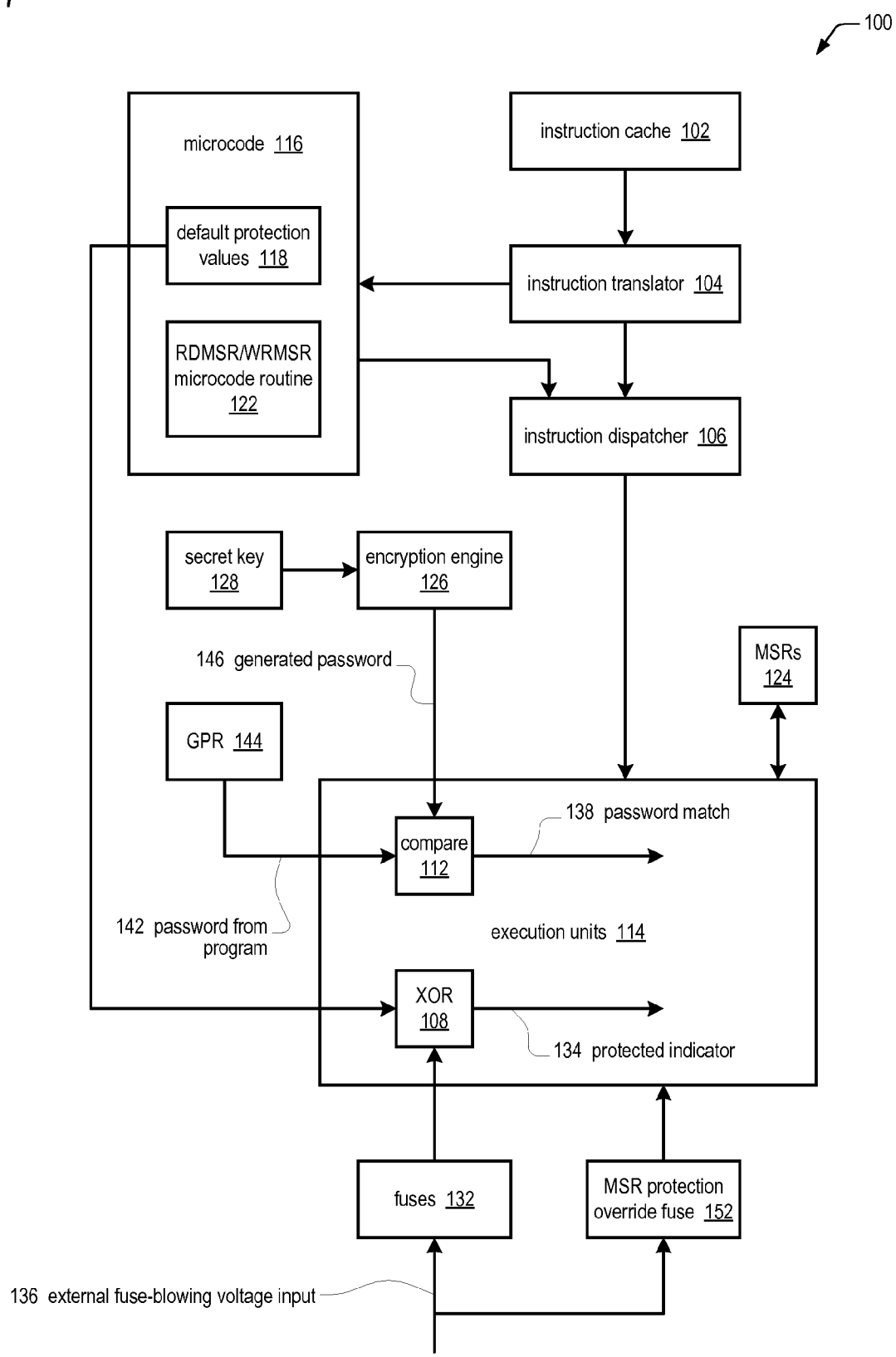
FIG. 1 is a block diagram illustrating a microprocessor according to the present invention.

Referring now to FIG. 1, a block diagram illustrating a microprocessor 100 according to the present invention is shown. The microprocessor 100 includes an instruction cache 102 that caches program instructions fetched and executed by the microprocessor 100. The program instructions may include instructions that access model specific registers (MSRs) 124, which are also referred to as model-specific registers (MSRs). In one embodiment, the program instructions that access the MSRs 124 are x86 architecture RDMSR and WRMSR instructions. Each MSR 124 is either a protected MSR 124 or an unprotected MSR 124. In particular, if an MSR 124 is a protected MSR 124, then a program that includes an instruction that attempts to access the MSR 124 must provide a correct password in order to access the MSR 124 which the instruction is instructing the microprocessor 100 to access; otherwise, the microprocessor 100 will deny the instruction access to the MSR 124, as described in more detail below.

The microprocessor 100 also includes fuses 132. The fuses 132 are configured such that the manufacturer of the microprocessor 100 may supply a prescribed voltage on an input 136 to the microprocessor 100 in order to selectively blow the fuses 132 on an individual basis. In one embodiment, the manufacturer specifies which fuse 132 to blow via a JTAG scan interface. The microprocessor 100 is configured to read a value from each fuse 132 which indicates whether the fuse 132 has been blown or is unblown. Each fuse 132 is associated with an MSR 124. Additionally, each MSR 124 has an associated default protection value 118 that specifies whether by default the MSR 124 is protected or unprotected. Advantageously, the microprocessor 100 manufacturer may change the protection characteristic of an MSR 124 from its default protection value 118 by blowing the fuse 132 associated with the MSR 124, as described in more detail below. In one embodiment, the microprocessor 100 includes two default protection values 118 associated with each MSR 124 and includes two fuses 132 associated with each MSR 124: one associated with read accesses to the MSR 124, and the other associated with write accesses to the MSR 124. Thus, whether an MSR 124 is protected or un-protected may be different for read accesses and write accesses to the MSR 124, as discussed in more detail below with respect to block 306 of FIG. 3.

Referring now to FIG. 2, a flowchart illustrating aspects of the design and manufacturing process of the microprocessor 100 of FIG. 1 according to the present invention is shown. Flow begins at block 202.

At block 202, the manufacturer decides which of the MSRs 124 will be in the list of protected MSRs 124 and which of the MSRs 124 will be in the list of unprotected MSRs 124. The manufacturer then designs the default protection value 118 for each MSR 124 into the microprocessor 100. Generally speaking, the manufacturer decides that an MSR 124 will be protected if it does not want normal users to be able to access the MSR 124, but would enable certain privileged users to access the MSR 124. An example of a privileged user is a motherboard manufacturer or system manufacturer that includes the microprocessor 100 in its motherboard or system design. The privileged user may need to access the protected MSR 124 in order to perform testing or configuration of the microprocessor 100, for example, by accessing the protected MSR 124. However, the manufacturer does not want other users, such as the end user of the system, to be able to access the MSR 124 in order to perform the same testing or configuration as the privileged user. Therefore, the manufacturer will supply the required password to the privileged user in order to enable the privileged user to access the protected MSRs 124. In one embodiment, each protected MSR 124 requires a different password to access it, which enables the manufacturer to provide selective access to individual protected MSRs 124 rather than allowing the privileged user access to all protected MSRs 124. In one embodiment, the default protection values 118 are a constant value coded into the microcode 116 (of FIG. 1) of the microprocessor 100. Flow proceeds to block 204.

At block 204, the manufacturer fabricates the microprocessor 100 parts with the fuses 132 of FIG. 1, i.e., a fuse 132 associated with each MSR 124. Additionally, the manufacturer fabricates the microprocessor 100 parts with the default MSR protection values 118 that were designed at block 202. As mentioned above, in one embodiment, the manufacturer fabricates the default protection values 118 into the microprocessor 100 by including them as a constant value in a microcode ROM 116. Flow proceeds to block 206.

At block 206, the manufacturer discovers that it made a mistake at block 202 when it decided on the protected and unprotected list membership. That is, the manufacturer discovers that it included an MSR 124 in the protected list that should not have been protected; or, the manufacturer discovers that it did not include an MSR 124 in the protected list that should have been protected. For example, the manufacturer may have assigned a default protection value 118 to the MSR 124 that made the MSR 124 protected, but later discovers that BIOS needs to access the MSR 124. Conversely, the manufacturer may have assigned a default protection value 118 to the MSR 124 that made the MSR 124 unprotected, but later discovers that end users are accessing the MSR 124 to reconfigure the parts in an undesirable fashion. Flow proceeds to block 208.

At block 208, the manufacturer blows the fuse 132 associated with the MSR 124 that it wants to have its default protection value 118 toggled. The manufacturer may blow the fuse 132 for parts that have already been manufactured and inventoried with the default protection value 118. Alternatively, the manufacturer may also include the step at block 208 in the manufacturing process for all parts manufactured in the future. Furthermore, the manufacturer may blow multiple of the fuses 132 to correct multiple mistakes in the protected list. Still further, the manufacturer may discover the mistake at block 206 multiple times during the lifetime of the microprocessor 100 and employ the step at block 208 to correct the mistake for multiple MSRs 124. Flow ends at block 208.

An important advantage of the present invention is that it potentially enables the manufacturer to enjoy large savings in terms of cost and time and possibly even reputation. In particular, in a conventional microprocessor without the benefit of the present invention, the manufacturer might have to stop shipment of the parts until it can create new semiconductor fabrication masks with the protection characteristic of the MSR 124 changed. Furthermore, the manufacturer of the conventional microprocessor might have to forego selling all of the already-manufactured parts with the wrong protection characteristic of the MSR 124. However, the manufacturer of the microprocessor 100 of the present invention may advantageously simply blow the appropriate fuse 132 in manufacturing of already-manufactured parts or future parts in order to remedy the problem, thereby potentially saving weeks of time and hundreds of thousands of dollars, particularly if the microprocessor 100 is already in volume manufacturing.

Referring again to FIG. 1, an instruction translator 104 receives instructions from the instruction cache 102 and, in the case of some instructions of the macroinstruction set of the microprocessor 100, translates the instructions (also referred to as macroinstructions) into one or more microinstructions that are actually executed by execution units 114 of the microprocessor 100. The microinstructions tend to be simpler than the macroinstructions. However, for some instructions of the macroinstruction set of the microprocessor 100, the instruction translator 104 transfers control to microcode sequences of microinstructions stored in a microcode ROM 116. In particular, when the instruction translator 104 encounters a macroinstruction that accesses (i.e., reads or writes) an MSR 124, the instruction translator 104 transfers control to the appropriate routine within the microcode 116. In one embodiment, when the instruction translator 104 encounters an x86 RDMSR or WRMSR instruction, the instruction translator 104 transfers control to the appropriate RDMSR/WRMSR microcode routine 122.

The RDMSR/WRMSR microcode routine 122 includes the default protection value 118 for each MSR 124 that specifies whether or not the MSR 124 is a protected MSR 124. In particular, if an MSR 124 is a protected MSR, then a program must provide a correct password in order to access the MSR 124 which the RDMSR/WRMSR instruction is instructing the microprocessor 100 to access, or else the microprocessor 100 will abort the RDMSR/WRMSR instruction. In one embodiment, the program supplies the password 142 from a register within a general purpose register (GPR) set 144 of the microprocessor 100. In one embodiment, the program supplies the password 142 from memory rather than from a GPR 144. In one embodiment, the program supplies the password 142 from an MSR 124, rather than from a GPR 144, by executing a WRMSR instruction to a non-protected MSR 124.

An instruction dispatcher 106 receives microinstructions, either from the instruction translator 104 or from the microcode 116 and dispatches the microinstructions to the execution units 114. The execution units 114 include an XOR unit 108. The XOR unit 108 performs a Boolean exclusive-OR (XOR) operation on two input values. In particular, the XOR unit 108 receives from the microcode 116 a default protection value 118 for an MSR 124 and receives the protection fuse 132 value associated with the MSR 124 and XORs the two values to produce a protected indicator 134.

The execution units 114 also include a comparator 112 that receives the MSR password provided by the program 142 and a password 146 generated by the microprocessor 100 and compares the two passwords to generate a password match indicator 138 that has a true value if the two passwords match and a false value otherwise. In one embodiment, the generated password 146 is provided by an encryption engine 126 that generates the password 146 using a secret key 128. In one embodiment, the encryption engine 126 is an AES encryption engine, and the length of the secret key 128 is 128 bits. In one embodiment, the length of the secret key 128 is 64 bits. In one embodiment, the plain text input to the AES encryption engine 126 includes a manufacturing ID of the microprocessor 100, obtainable by the user, which is unique to each individual microprocessor 100 part. Thus, the AES encryption engine 126 produces a cipher text password 146 that is also unique to each individual microprocessor 100 part. When the privileged user wants to access an MSR 124 of a particular part, the user provides the manufacturing ID of the part to the microprocessor 100 manufacturer. The manufacturer, being the only knower of the secret key 128 value hidden within the microprocessor 100, generates a password 142 using the manufacturing ID provided by the user and the secret key 128 value, and provides the generated password 142 to the user. The user then inputs the password 142 to the microprocessor 100, which the microprocessor 100 compares with the password 146 it generates, as discussed below with respect to block 314 of FIG. 3. As mentioned above, in one embodiment the manufacturer can limit the user to access only individual MSRs 124. In this case, the user must also supply to the manufacturer the number of the particular MSR 124, and the manufacturer includes the MSR 124 number along with the manufacturing ID into the plain text input when generating the user password 142. Similarly, the microcode 122 includes the MSR 124 number specified by the RDMSR/WRMSR instruction along with the manufacturing ID in the plain text input to the AES encryption engine 126 to produce the cipher text password 146.

The microprocessor 100 also includes an MSR protection feature override fuse 152, whose output is received by the execution units 114. The override fuse 152 is configured such that the manufacturer of the microprocessor 100 may supply a prescribed voltage on an input 136 to the microprocessor 100 in order to selectively blow the override fuse 152. In one embodiment, the manufacturer specifies that it wants to blow the override fuse 152 via a JTAG scan interface. If the manufacturer blows the override fuse 152, then the microprocessor 100 does not employ the MSR protection feature described herein.

Referring now to FIG. 3, a flowchart illustrating operation of the microprocessor 100 of FIG. 1 to process a RDMSR/WRMSR instruction according to the present invention is shown. Flow begins at block 302.

At block 302, instruction translator 104 encounters a RDMSR/WRMSR instruction during execution of a program and invokes the RDMSR/WRMSR microcode routine 122 of FIG. 1. Flow proceeds to decision block 303.

At decision block 303, the RDMSR/WRMSR microcode routine 122 reads the MSR protection override fuse 152 of FIG. 1 to determine whether or not is has been blown. If so, flow proceeds to block 312; otherwise, flow proceeds to block 304.

At block 304, the RDMSR/WRMSR microcode routine 122 reads the fuse 132 of FIG. 1 associated with the MSR 124 specified by the RDMSR/WRMSR instruction encountered at block 302. Flow proceeds to block 306.

At block 306, the RDMSR/WRMSR microcode routine 122 causes the XOR unit 108 to XOR the default protection value 118 of FIG. 1 associated with the MSR 124 specified by the RDMSR/WRMSR instruction encountered at block 302 with the associated fuse value 132 read at block 304 to generate the indicator 134 of FIG. 1 of whether the specified MSR 124 is protected or unprotected. In one embodiment, the microprocessor 100 includes two default protection values 118 associated with each MSR 124 and includes two fuses 132 associated with each MSR 124: one associated with read accesses to the MSR 124, and the other associated with write accesses to the MSR 124. Thus, whether an MSR 124 is protected or unprotected may be different for read accesses and write accesses to the MSR 124. Thus, at block 304 the RDMSR microcode routine 122 reads the fuse 132 associated with read accesses of the MSR 124, and at block 306 the RDMSR microcode routine 122 causes the XOR unit 108 to XOR the default protection value 118 associated with read accesses of the MSR 124 with the associated fuse value 132 read at block 304 to generate the indicator 134 of whether the specified MSR 124 is protected or unprotected for read accesses; conversely, at block 304 the WRMSR microcode routine 122 reads the fuse 132 associated with write accesses of the MSR 124, and at block 306 the WRMSR microcode routine 122 causes the XOR unit 108 to XOR the default protection value 118 associated with write accesses of the MSR 124 with the associated fuse value 132 read at block 304 to generate the indicator 134 of whether the specified MSR 124 is protected or unprotected for write accesses. Flow proceeds to decision block 308.

At decision block 308, the RDMSR/WRMSR microcode routine 122 examines the indicator 134, and if the indicator 134 indicates the MSR 124 is protected, flow proceeds to block 314; otherwise, flow proceeds to block 312.

At block 312, the RDMSR/WRMSR microcode routine 122 completes the RDMSR/WRMSR instruction. That is, the RDMSR/WRMSR microcode routine 122 writes the specified MSR 124 with the specified value in the case of a WRMSR instruction, or reads the specified MSR 124 in the case of a RDMSR instruction. Flow ends at block 312.

At block 314, the RDMSR/WRMSR microcode routine 122 causes the encryption engine 126 to generate the processor-generated password 146 using the secret key 128, and then causes the comparator 112 to compare the program-supplied password 142 with the processor-generated password 146 to generate the password match indicator 138 of FIG. 1. Flow proceeds to decision block 316.

At decision block 316, the RDMSR/WRMSR microcode routine 122 examines the password match indicator 138. If the password match indicator 138 indicates the passwords match, flow proceeds to block 312; otherwise, flow proceeds to block 318.

At block 318, the RDMSR/WRMSR microcode routine 122 blocks access to the MSR 124 specified by the RDMSR/WRMSR instruction since the specified MSR 124 is password protected, yet the program failed to supply the correct password. Flow ends at block 318.

Although embodiments have been described in which the microprocessor generates a password using the AES encryption engine 126, the microprocessor 100 may generate the password by other means.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, in addition to using hardware (e.g., within or coupled to a Central Processing Unit ("CPU"), microprocessor, microcontroller, digital signal processor, processor core, System on Chip ("SOC"), or any other device), implementations may also be embodied in software (e.g., computer readable code, program code, and instructions disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). Embodiments of the present invention may include methods of providing a microprocessor described herein by providing software describing the design of the microprocessor and subsequently transmitting the software as a computer data signal over a communication network including the Internet and intranets. It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the herein-described exemplary embodiments, but should be defined only in accordance with the following claims and their equivalents. The present invention is implemented within a microprocessor device which may be used in a general purpose computer.

Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor having model specific registers (MSRs), the microprocessor comprising:
   for each of the MSRs, an associated default value that indicates whether the MSR is protected or non-protected; and
   for each of the MSRs, an associated fuse that, if blown, toggles the associated default value from protected to non-protected or non-protected to protected, wherein the associated fuse, if blown to toggle the default protection value associated with the MSR, is blown during manufacturing of the microprocessor.

2. The microprocessor of claim 1, further comprising:
   microcode, configured to perform the following in response to the microprocessor encountering an instruction that accesses a specified MSR of the MSRs:
   determine whether the fuse associated with the specified MSR is blown or unblown;
   use the default value associated with the specified MSR as an indicator of whether the specified MSR is protected if the fuse associated with the specified MSR is unblown;
   toggle the default value associated with the MSR to generate the indicator if the fuse associated with the specified MSR is blown;
   protect access to the specified MSR if the indicator indicates the specified MSR is protected; and
   refrain from protecting access to the specified MSR if the indicator indicates the specified MSR is non-protected.

3. The microprocessor of claim 2, wherein in order to protect access to the specified MSR if the indicator indicates the specified MSR is protected, the microcode prohibits access by the instruction to the specified MSR unless a program that includes the instruction provides a correct password to the microprocessor.

4. The microprocessor of claim 3, further comprising:
   an encryption engine, configured to generate a password;
   wherein the microcode is configured to compare the password generated by the encryption engine with the password provided by the program in order to determine whether the program provided the correct password.

5. The microprocessor of claim 4, further comprising:
   a key value, wherein the encryption engine is configured to generate the password using the key value.

6. The microprocessor of claim 5, wherein the key value is non-visible to the program.

7. The microprocessor of claim 1, wherein the default values that indicate whether the associated MSR is protected or non-protected are specified within microcode of the microprocessor.

8. The microprocessor of claim 1, wherein some of the MSRs are non-architectural MSRs of the microprocessor.

9. The microprocessor of claim 1, wherein the fuses and the default values are fabricated into the microprocessor.

10. The microprocessor of claim 1, wherein the fuses are configured to be blown subsequent to fabrication of the microprocessor.

11. A method for protecting access to model specific registers (MSRs) within a microprocessor, the method comprising:
    fabricating the microprocessor to include, for each of the MSRs, an associated default value that indicates whether the MSR is protected or non-protected;
    fabricating the microprocessor to include, for each of the MSRs, an associated fuse that, if blown, toggles the associated default value from protected to non-protected or non-protected to protected; and
    blowing one or more of the fuses subsequent to said fabricating the microprocessor to include, for each of the MSRs, the associated default value and the associated fuse, wherein said blowing is performed during manufacturing of the microprocessor.

12. The method of claim 11, further comprising:
    in response to encountering an instruction that accesses a specified MSR of the MSRs:
    determining whether the fuse associated with the specified MSR is blown or unblown;
    using the default value associated with the specified MSR as an indicator of whether the specified MSR is protected if the fuse associated with the specified MSR is unblown;
    toggling the default value associated with the MSR to generate the indicator if the fuse associated with the specified MSR is blown;
    protecting access to the specified MSR if the indicator indicates the specified MSR is protected; and
    refraining from protecting access to the specified MSR if the indicator indicates the specified MSR is non-protected.

13. The method of claim 11, wherein the default values that indicate whether the associated MSR is protected or non-protected are specified within microcode of the microprocessor.

14. A method for protecting access to model specific registers (MSRs) within a microprocessor, the method comprising:
    encountering an instruction that accesses a specified MSR of the MSRs;
    determining whether a fuse associated with the specified MSR is blown or unblown;
    using a default value associated with the specified MSR as an indicator of whether the specified MSR is protected if the fuse associated with the specified MSR is unblown;
    toggling the default value associated with the MSR to generate the indicator if the fuse associated with the specified MSR is blown, wherein the associated fuse, if blown to toggle the default protection value associated with the MSR, is blown during manufacturing of the microprocessor;
    protecting access to the specified MSR if the indicator indicates the specified MSR is protected; and
    refraining from protecting access to the specified MSR if the indicator indicates the specified MSR is non-protected.

15. The method of claim 14, wherein said protecting access to the specified MSR if the indicator indicates the specified MSR is protected comprises prohibiting access by the instruction to the specified MSR unless a program that includes the instruction provides a correct password to the microprocessor.

16. The method of claim 15, further comprising:
    generating a password, wherein said generating is performed by an encryption engine of the microprocessor; and comparing the password generated by the encryption engine with the password provided by the program in order to determine whether the program provided the correct password.

17. The method of claim 16, wherein the encryption engine generates the password using a key value.

18. The method of claim 17, wherein the key value is non-visible to the program.

19. The method of claim 14, wherein the default values that indicate whether the associated MSR is protected or non-protected are specified within the microcode of the microprocessor.

20. A computer program product for use with a computing device, the computer program product comprising:
  a non-transitory computer usable storage medium, having computer readable program code embodied in said medium, for specifying a microprocessor having model specific registers (MSRs), the computer readable program code comprising:
    first program code for specifying for each of the MSRs, an associated default value that indicates whether the MSR is protected or non-protected; and
    second program code for specifying for each of the MSRs, an associated fuse that, if blown, toggles the associated default value from protected to non-protected or non-protected to protected, wherein the associated fuse, if blown to toggle the default protection value associated with the MSR, is blown during manufacturing of the microprocessor.

21. The computer program product of claim 20, further comprising:
  third program code for specifying microcode, configured to perform the following in response to the microprocessor encountering an instruction that accesses a specified MSR of the MSRs:
    determine whether the fuse associated with the specified MSR is blown or unblown;
    use the default value associated with the specified MSR as an indicator of whether the specified MSR is protected if the fuse associated with the specified MSR is unblown;
    toggle the default value associated with the MSR to generate the indicator if the fuse associated with the specified MSR is blown;
    protect access to the specified MSR if the indicator indicates the specified MSR is protected; and
    refrain from protecting access to the specified MSR if the indicator indicates the specified MSR is non-protected.

22. The computer program product of claim 21, wherein in order to protect access to the specified MSR if the indicator indicates the specified MSR is protected, the microcode prohibits access by the instruction to the specified MSR unless a program that includes the instruction provides a correct password to the microprocessor.

23. The computer program product of claim 22, further comprising:
  fourth program code for specifying an encryption engine, configured to generate a password;
  wherein the microcode is configured to compare the password generated by the encryption engine with the password provided by the program in order to determine whether the program provided the correct password.

24. The computer program product of claim 23, further comprising:
  fifth program code for specifying a key value, wherein the encryption engine is configured to generate the password using the key value.

25. The computer program product of claim 24, wherein the key value is non-visible to the program.

26. The computer program product of claim 20, wherein the default values that indicate whether the associated MSR is protected or non-protected are specified within microcode of the microprocessor.

27. The computer program product of claim 20, wherein some of the MSRs are non-architectural MSRs of the microprocessor.

28. The computer program product of claim 20, wherein the fuses and the default values are fabricated into the microprocessor.

29. The computer program product of claim 20, wherein the fuses are configured to be blown subsequent to fabrication of the microprocessor.

* * * * *

UNITED STATES PATENT AND TRADEMARK OFFICE
CERTIFICATE OF CORRECTION

PATENT NO. : 8,402,279 B2  
APPLICATION NO. : 12/391781  
DATED : March 19, 2013  
INVENTOR(S) : G. Glenn Henry and Terry Parks Page 1 of 1

It is certified that error appears in the above-identified patent and that said Letters Patent is hereby corrected as shown below:

In the Claims

In column 11, replace line 11 with the following amended line in which the first "the" is deleted:
protected are specified within "the" microcode of the micropro- Signed and Sealed this
Twenty-third Day of April, 2013

Teresa Stanek Rea
*Acting Director of the United States Patent and Trademark Office*